United States Patent [19]

Krivec

[11] 4,168,771
[45] Sep. 25, 1979

[54] ROLLER CONVEYOR SYSTEM HAVING SPEED CONTROL

[75] Inventor: Bert Krivec, Brookfield, Wis.

[73] Assignee: Rexnord Inc., Milwaukee, Wis.

[21] Appl. No.: 840,208

[22] Filed: Oct. 7, 1977

[51] Int. Cl.² .............................................. B65G 13/00
[52] U.S. Cl. .................................. 193/35 A; 152/321; 152/326; 193/37
[58] Field of Search ............... 193/35 A, 37; 152/153, 152/246, 321, 326

[56] References Cited

U.S. PATENT DOCUMENTS

| | | | |
|---|---|---|---|
| 1,292,345 | 1/1919 | Martin | 152/326 |
| 2,742,941 | 4/1956 | Johnson | 152/326 |
| 3,443,674 | 5/1969 | Kornylak | 193/37 |
| 4,006,810 | 2/1977 | Kornylak | 193/35 A |
| 4,037,635 | 7/1977 | Ippen et al. | 152/326 |

Primary Examiner—Jeffrey V. Nase

[57] ABSTRACT

A free wheeling tire having the ability to resist increased rotational speed under load is comprised of a hub portion, rim portion, and a multiplicity of flexure members defining voids extending continuously from one side of the tire to another. Deleterious heat generated during operation is successfully dissipated through the increased surface area provided by the voids and by the nature of geometrical element configuration. The tires are placed in a gravity roller conveyor in arrays where each array may have different speed control characteristics permitting variations in speeds of objects as they move from one array to another.

2 Claims, 18 Drawing Figures

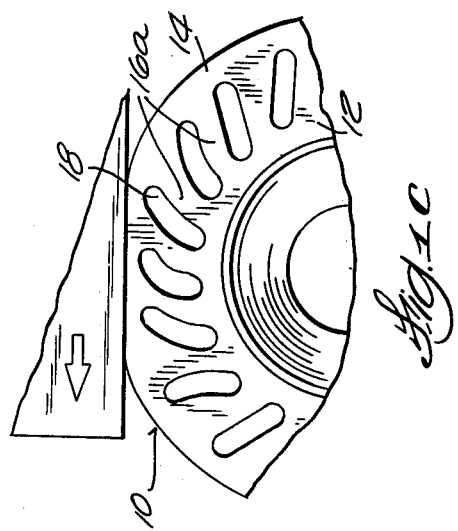
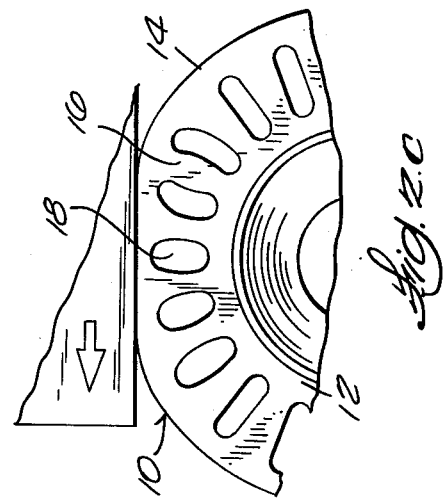
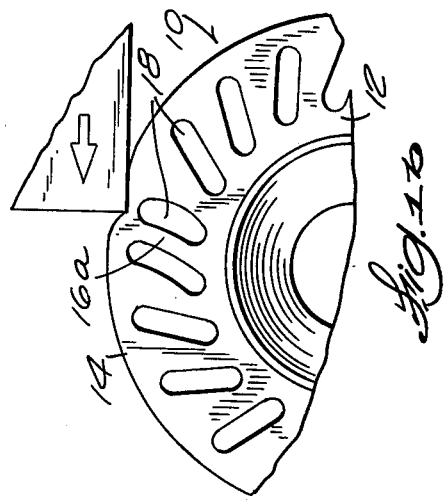
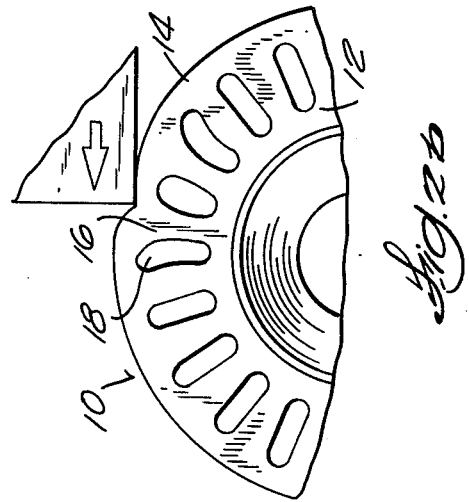
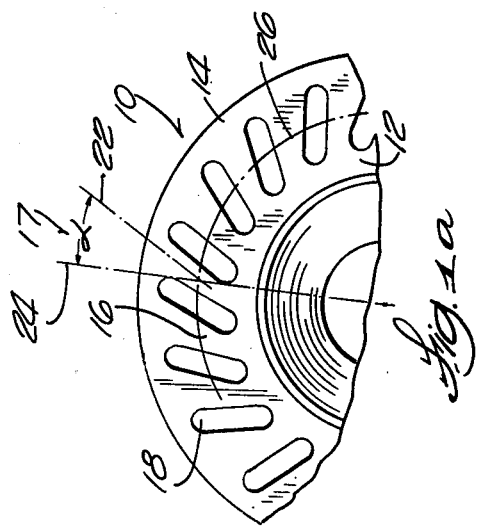
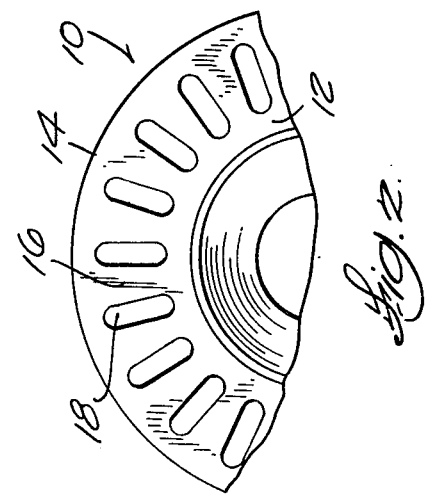

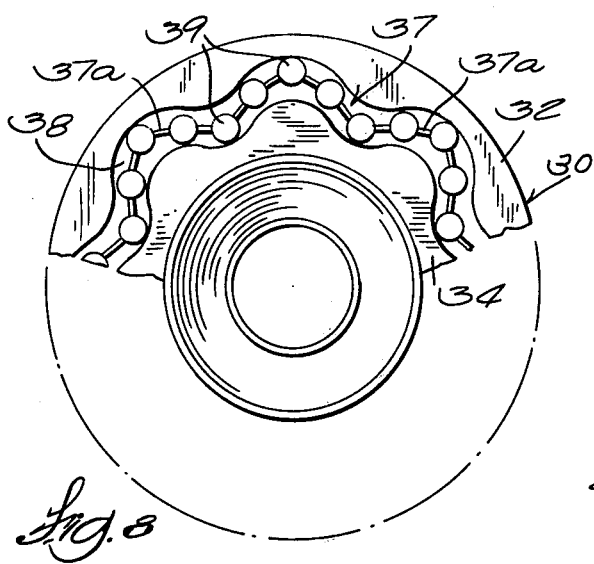
Fig. 8
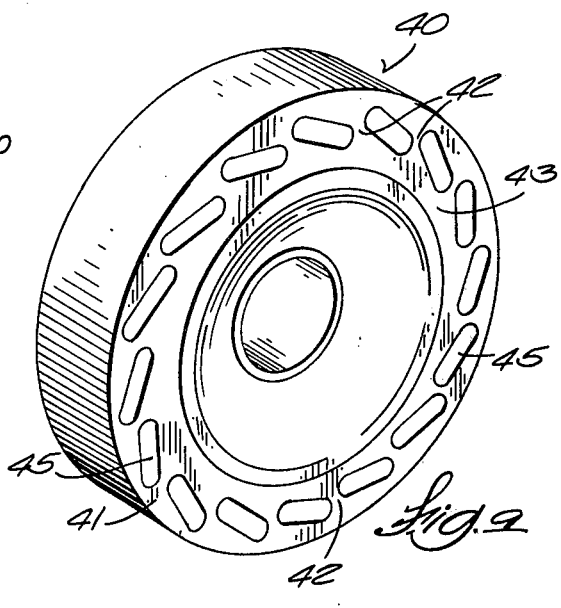
Fig. 9
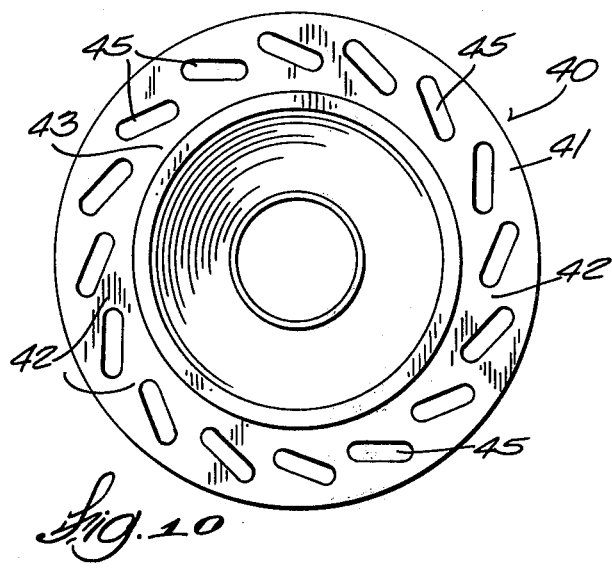
Fig. 10
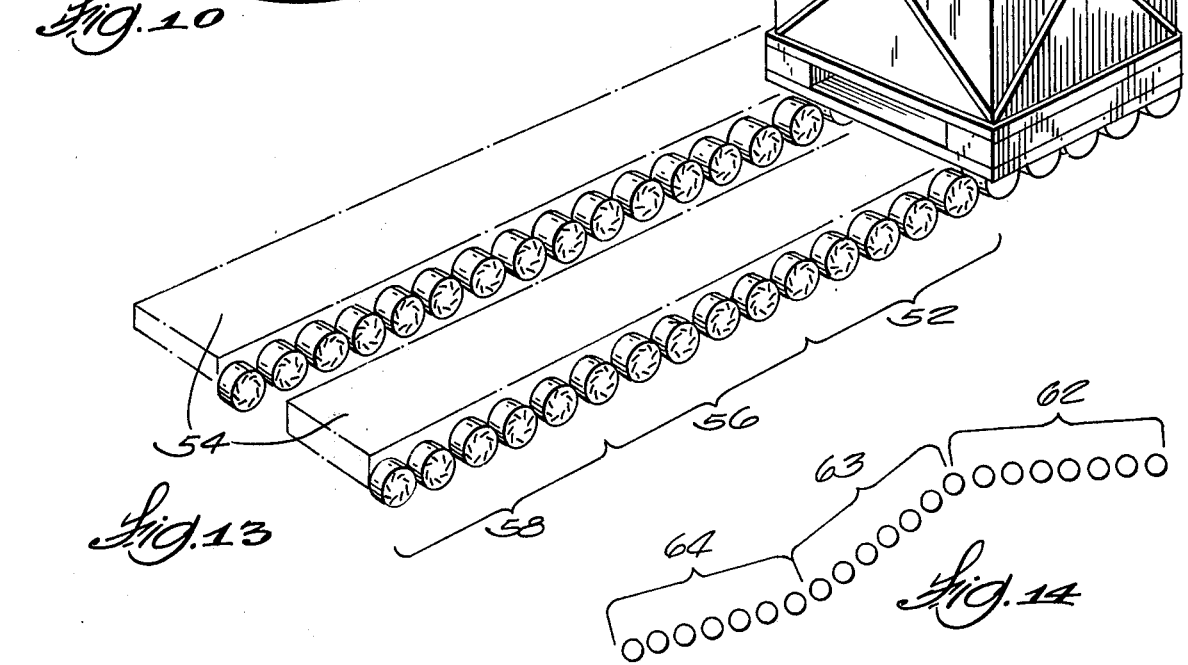
Fig. 13
Fig. 14

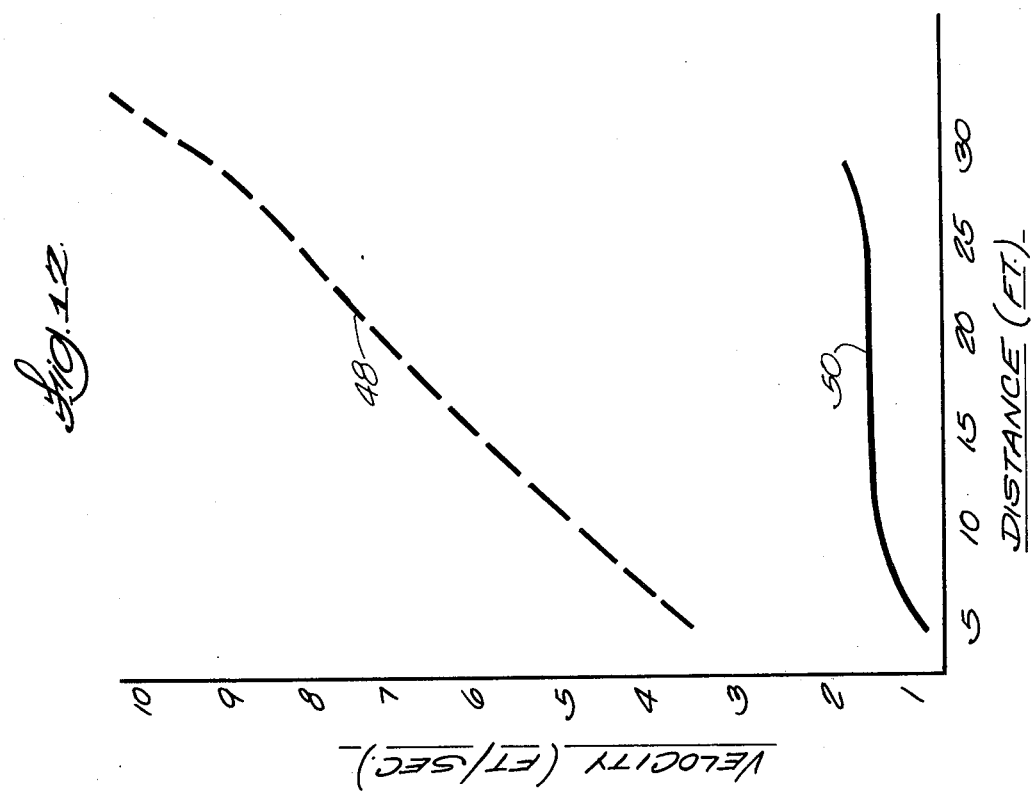
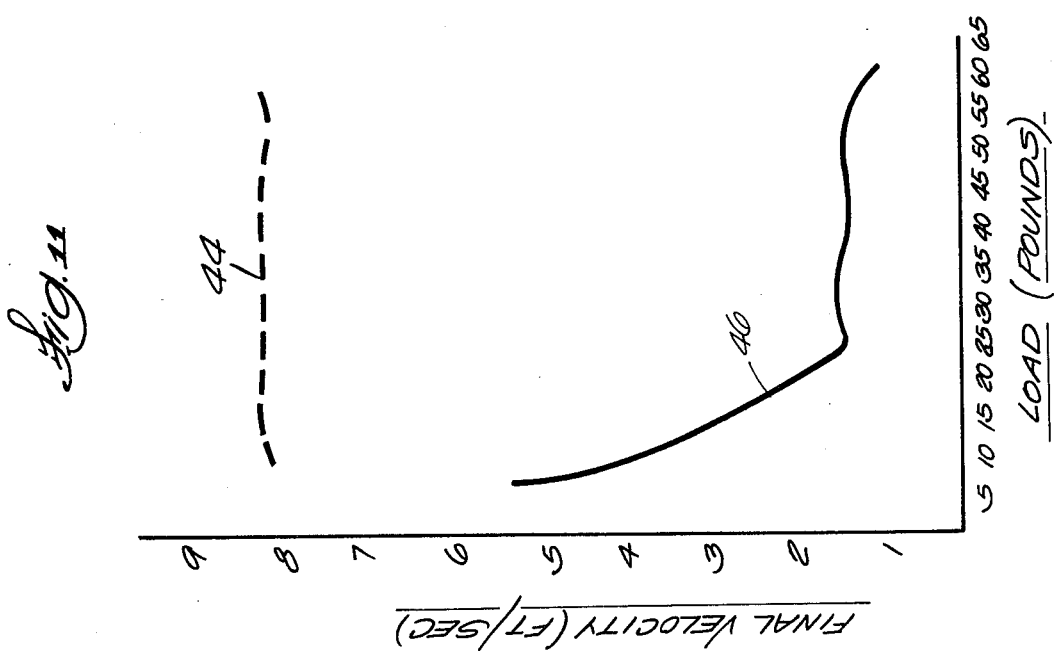

ROLLER CONVEYOR SYSTEM HAVING SPEED CONTROL

BACKGROUND OF THE INVENTION

1. Field of the Invention

This invention pertains to free wheeling tires particularly useful in a gravity roller conveyor, and the like having the ability to retard accelerated movement of the load carried by the wheels.

2. Discussion of the Prior Art

In many instances it is desireable to prevent increased rotational velocities of free-wheeling tires, wheels, or rollers. For example, in applications such as in mining operations, it is necessary that means be provided to guard against ore-bearing carts from running away and endangering property and personnel. Similarly, in applications where pallets and cargo are moved down an inclined path of free-wheeling rollers such as in gravity conveyors, the need to prevent high speeds of the pallet is always present.

Various devices to accomplish the above are found in the prior art. For example, U.S. Pat. No. 3,621,960 describes a gravity conveyor having rollers to retard the speed of the load. Each is provided with a tire formed of a polymer having a certain durometer hardness range. Durometer itself is only a measurement of the hardness of an elastomeric material and provides little insight into the appropriateness of that material under various temperatures or even at later times after extended operations. For example, since the elastic moduli of elastomers generally decreases as temperature increases, the durometer of a material at an initial time and temperature is of little value in predicting how an elastomer might perform under load at a later time where the temperature is elevated. It is also known that durometer readings may not accurately reflect the behaviour of elastomers throughout a tensile test.

The patentee points out that the surface material has high hysteresis properties, i.e., the ability to absorb energy upon deformation and convert it to heat. In other words, the energy lost in generating heat is derived from the energy used to rotate the tire. In applications where gravity is acting upon the loaded tire, the tire would otherwise steadily increase in rotational speed. The hysterisis characteristic of the tire offsets the affect of gravity such that the tire rotates at a constant speed. Hysterisis measurements of an elastomer, however, involve a complex set of variables. However, for purposes here, it can be said that hysterisis (H) and resilience (R) have the following relationship:

$$R = 1 - H$$

Thus, the larger hysterisis of a material becomes, the less resilience it has. The heat generated must be dissapated quickly or ultimately the heated material behaves in a manner different than its initial behavior. The prior art, as for example the aforementioned U.S. Pat. No. 3,621,960, does not appear to have recognized the problem of excess heat generation which deleteriously affects the operation of constant speed wheels. It follows that no solution has been sought, much less found.

As mentioned before, resiliency and hysterisis of elastomeric materials are inversely related. Although neither can be determined exactly, emperical relationships can be employed which adequately predict the values at a particular temperature. A tire, wheel, or roller designed to maintain essentially constant rotational speeds under various loads must necessarily have a higher hysterisis value. It is desireable that the resiliency value throughout operation be essentially the same as the initial resilience value. This also fixes the hysterisis value.

Thus, it becomes a paramount object of the present invention to provide a rotating element structure which maintains essentially constant rotational speeds under load and which readily dissapates heat generated by deformation during operation.

Because it is necessary for apparatus such as gravity conveyors to control the speed of the descending load, still another object of the present invention is to provide a device which will limit the speed of an object moving thereover to a predetermined terminal velocity.

Applications employing speed control wheels have additionally been limited to using wheels of various compositions, each composition designed for a specific hysterisis effect and therefore a different speed control effect. From an economic standpoint, it would be highly desireable to have wheels which provide the desired speed control effects but where the composition of material remains unchanged. Thus, it is still further important object of the present invention to provide for rotating element structures where the hysterisis behaviour characteristics can be varied without changing the composition of the structure.

SUMMARY OF THE INVENTION

The present invention provides for a tire which comprises a hub portion, a rim portion, and a multiplicity of flexure members extending from the hub portion to the rim portion. The flexure members define voids which continuously extend from one side of the tire to the other. The flexure members are deformable under load into the adjacent voids. Heat generated due to deformation escape to the voids and through the sides of the tire. Thus, the resiliency of the structure is largely unaffected by the rapid dissapation of the heat.

The composite structure of hub portion, rim portion, and flexure members collectively have a predetermined initial resiliency. Additionally, resiliency of various values may be employed independently of the durometer hardness of the hub portion of the structure.

It should be noted that throughout this specification the words tire, roller and wheel are often used interchangeably. No limitations are intended by the choice of the words. Each may have different meanings depending upon the application involved. However, the intent is that the invention as defined herein may be employed whenever it is desired to maintain constant rotational speeds of a rotatable structure under load or, in the alternative, to maintain constant the speed of an object passing over array of the rotatable structures. The most readily apparent application is, as mentioned before, with gravity conveyors and loaded carts moving along inclined planes. Other applications may become more readily apparent upon reading the disclosure.

DESCRIPTION OF THE DRAWINGS

FIGS. 1a, 1b, 1c depict schematically the sequential rotation of a loaded wheel constructed in accordance with one embodiment of the present invention.

FIGS. 2a, 2b, 2c depict schematically the sequential rotation of a loaded wheel constructed in accordance with another embodiment of the present invention.

FIG. 8 is a diagramtical side view of a wheel constructed in accordance with still another embodiment which has means to resist compression beyond a predetermined point.

FIG. 9 is a perspective view of a prototype wheel used in testing.

FIG. 10 is a side view of the wheel of FIG. 9.

FIG. 11 is a graph depicting final velocity as a function of load.

FIG. 12 is a graph depicting velocity at any point along the path of a loaded free wheeling cart as a function of the distance traveled.

FIG. 13 is a diagramatical view of a gravity conveyor utilizing wheels constructed in accordance with the present invention.

FIG. 14 is a schematic of a three tiered gravity conveyor with each tier having a different angle of inclination and wheels constructed in accordance with the present invention.

DETAILED DESCRIPTION

The Preferred Embodiment

Figure 3:
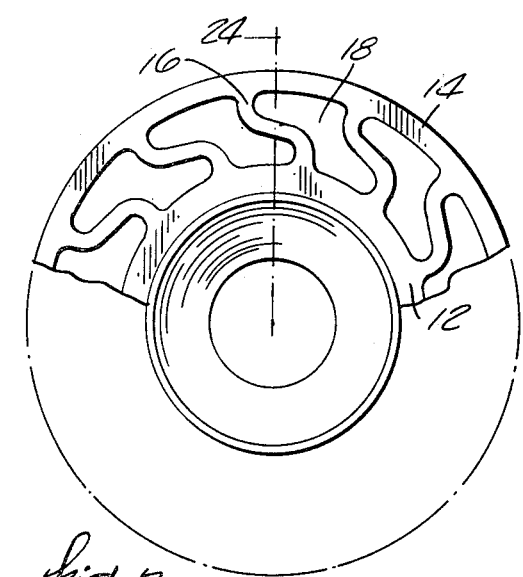
FIG. 3 is a diagramatical side view of a wheel constructed in accordance with an additional embodiment of the present invention.

Attention is now drawn to FIG. 1a which depicts a section of a tire 10 in accordance with a preferred embodiment of the present invention. Wheel or tire 10 is comprised of three portions, namely a hub portion 12, a rim portion 14, and a plurality of flexure members 16 which extend from the hub portion 12 to rim portion 14. Flexure members 16 define a plurality of voids 18 which extend through tire 10 from one side to the other. Hub portion 12 is adapted to be secured to a hub for rotation about an axis. Since the hub may be part of any conventional bearing member and does not form part of the present invention, it is not depicted in the drawings.

As should be noted, the tire 10 is an integral piece which from a fabrication standpoint is preferred. This is particularly desireable when the tire composition is such that it can be formed through an injection molding process or the like. Many materials can be employed, such as various rubber compositions and polymers.

Obviously, the total resiliency must lie between practical limits established by the needs of a particular application. What is important is that the resiliency be chosen such that the rotatable structure under load will free-wheel, for example, under the influence of gravity down an inclined plane at about a constant rate, irrespective of the distance traveled.

Because the voids extend through the tire, the surface area of the material is greatly increased. Heat generated due to the deformation of the material can be readily dissapated into the surrounding air. The resiliency of the tire constructed as in FIG. 1 is largely unaffected by the generation of heat because it is rapidly dissapated. In contrast, the prior art most pertinent to this disclosure does not appear to recognize the problem associated with heat generation. It is well known that the elastic modulus of most materials, particularly elastomers, is affected by temperature changes. Resiliency, of course, depends to a great extent upon elasticity of material since it is roughly a measurement of work needed to return an object to its original shape. Consequently, if resiliency of a rotating object under load changes with temperature, then the speed at which the object rotates will vary also. Continued operation without good heat dissapation will ultimately shorten the useful life of an elastomer tire.

In this embodiment, resiliency of the tire is contributed by all three portions. Rim portion 14 undergoes a complex state of stress when loaded and provides a hysterisis behavoir predominantly attributable to the composition of the material. Flexure members 16 are bent under load and provide still another hysterisis effect due to bending. Finally, the region of the hub portion 12 opposite to the loaded region of rim portion 14 undergoes tension and contributes still more to the hysterisis of wheel 10. The behavior of wheel 10 is therefore made up of the total contribution of the three portions. Thus, the resiliency of the structure is established not only by the appropriate choice of materials but by the geometry or arrangement of flexure members 16. It has been found that the shape, size, and orientation of flexure members 16 can greatly affect the total resiliency of tire 10. The "angle of inclination" of flexure members 16, for example, can be varied to provide substantially different resiliencies to wheel 10. The angle of inclination is defined as the angle $\alpha$ (denoted by character 17) between the center line 22 of a flexure member 16 and the radial line 24 which passes through the intersection of center line 22 and the tire median line 26. Rotation of tire 10 in one direction provides a resiliency different from the other direction. Looking at FIGS. 1(b) and 1(c) which show sequentially the right to left movement of load object (causing a counterclockwise rotation), it can be seen that this movement would initially provide a force which would cause a flexure member 16a to bend to the left. In the next instant, the load force acting on the member 16a has a resultant along member 16a which is compressive. Finally, member 16a buckles to the right as seen in FIG. 1(c). This effect causes the tire to exhibit a greater resilience when rotated under load in one direction than the other. The asymmetrical behavior provides a unique characteristic which is often desireable when handling loads of different magnitudes. Where small loads are being handled along a gravity conveyor, it may be necessary to use wheels having very low resiliency values, i.e., high hysterisis, to control the speed of descent. Larger loads could later be handled by merely reversing the conveyor orientation so that the wheels also are positioned reversed.

Other Embodiments

As mentioned before, durometer hardness is not a good predictor of behavior of elastomeric material under dynamic and time extensive operation conditions. It also fails completely to indicate the behavior of a tire which is not a continuous medium. Because the tire illustrated in FIG. 1 utilizes flexure members in the manner described, the resiliency and hysteresis characteristics can be varied substantially independently from the durometer of the material composition. This is further illustrated by the embodiments in FIGS. 2 through 8.

Referring first to the embodiment illustrated in FIGS. 2(a)–(c), it should be noted that flexure members 16 are aligned substantially along the radial lines. Compression is involved to a great extent no matter which way the tire rotates under load. Buckling then occurs an instant later. The tire 10, however, as in the embodiment of FIGS. 1(a)–(c), is molded of one piece and obviously could be made of the same material as the FIG. 1 embodiment. Yet the resilience would be different because of the structure of the tire beneath the rim portion. On the other hand, the embodiment of FIG. 3 discloses a curved flexure member 16 having symmetry about the radial lines. Compression is present but minimized; the direction of rotation is inconsequential since the flexible members bend readily irrespective of rotation.

Figure 4:
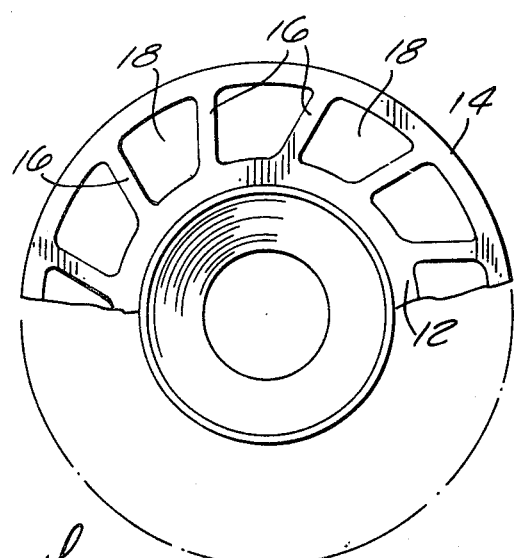
FIG. 4 is a diagramatical side view of a wheel constructed in accordance with an embodiment having large voids between flexure members.
Figure 5:
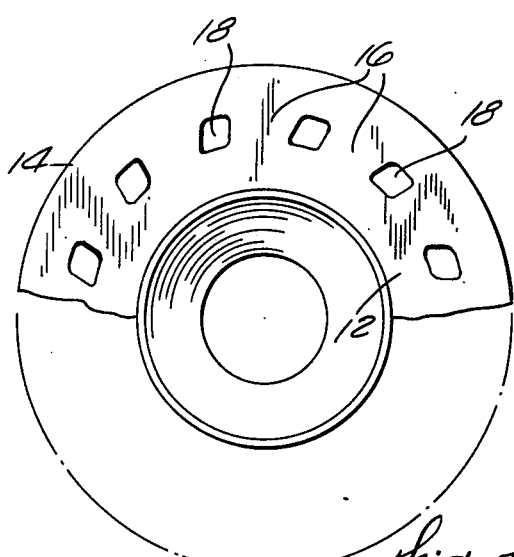
FIG. 5 is a diagramatical side view of a wheel constructed in accordance with an embodiment having small voids between flexure members.

The embodiment of FIG. 4 depicts a tire in which the volume occupied by the voids 18 are considerably larger than the corresponding volume of members 16. The resiliency is directly affected by the changed void size and becomes smaller as the void size is increased, assuming identical materials are employed. Similarly, the reverse could be utilized where the voids are made small as in FIG. 5. Obviously, the smaller the voids, the closer the tire becomes functionally to that of a continuous medium tire. The advantage of cooling, however, does remain until the voids become extremely small.

Figure 6:
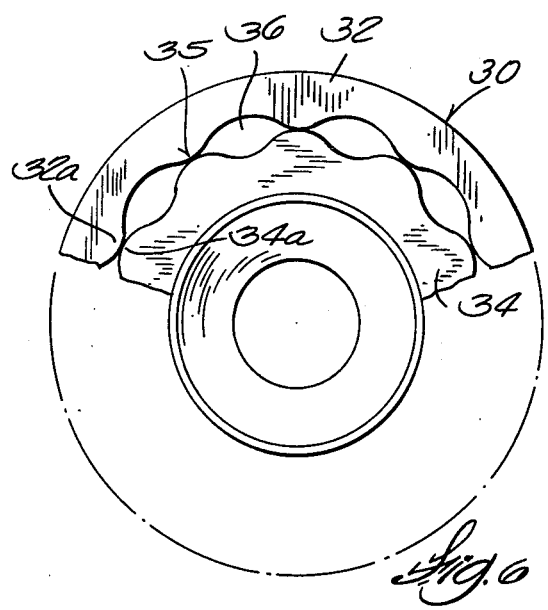
FIG. 6 is a diagramatical side view of a wheel constructed in accordance with still another embodiment of the present invention wherein the hub and rim portion are secured at spaced intervals to one another.
Figure 7:
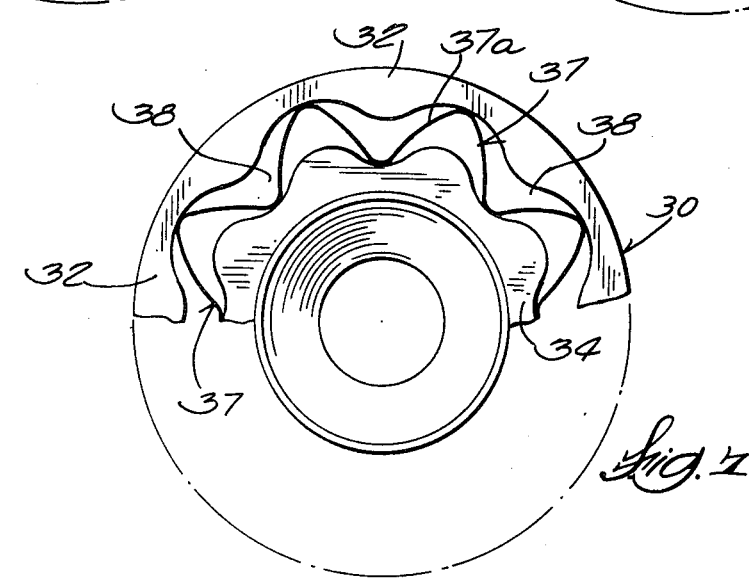
FIG. 7 is a diagramatical side view of a wheel constructed in accordance with another additional embodiment of the present invention in which the flexure member alternatively contacts the hub and rim portions at spaced intervals.

FIGS. 6, 7, and 8 illustrate various types of composite tire structures all within the scope of the present invention, but are different from those depicted above in that two or more compositions are employed. FIG. 6, for example, shows a tire 30 having a rim portion 32 and a hub portion 34 of different composition. Rim 32 may be an elastomeric polymer having a ridged internal structure while hub portion 34 may be a metallic or elastomeric composition similarly ridged about its external diameter. The peaks 32a of rim portion 32 are adhered to the peaks 34a of hub portion 34 through appropriate adhesives or integrated mechanical lock configuration. The adhered peaks 32a, 34a thus constitute or represent integrated flexure members 35. Voids 36 are defined between the ridges and are continuous from one side to the other. As before, the voids 36 provide an avenue of escape for the generated heat.

The advantages of such a structure are many. For example, it may be desireable for certain applications to select materials having resilience values which react differently as the temperature of each increases. By choosing one material having a resilience directly proportional to temperature increase and another whose resilience is inversely proportional to temperature increase, a wheel may be fabricated having a resiliency even more resistant to change resulting from generated heat. For example, a wheel having a rim and hub portions made from steel or aluminum with a flexure member and hub portion made from a material commercially available under the trademark VITON or from Neoprene will provide this unusual characteristic.

FIG. 7 depicts still another embodiment of a composite wheel which may be comprised of three separate materials. As in the FIG. 6 embodiment, rim portion 32 and hub portion 34 are ribbed but in this instance, are separated by a curved member 37. Curved member 37 as illustrated follows the contour of alternate ribs and is adhered or secured at locations to the hub portion 34 or rim portion 32. The arms 37a form flexure elements. As rim portion 32 bears a load, curved flexure member 37 deflects into the adjacent voids 38.

The precise composition of a composite tire as desired depends greatly upon the application. For example, the outer rim may be vulcanized rubber while the hub portion is a urethane polymer. The curved member 37 may be a stiffer polymer, stainless steel, fiber glass, or spring steel, treated to adhere both to rubber and the polymer if so required. Alternatively, curved member 37 could be mechanically locked into the rim and hub portion.

In the event that it is desired to prevent deflection beyond a predetermined load level, an embodiment such as disclosed in FIG. 8 might be employed. As shown, non-resilient members such as spherical metallic elements 39 can be adhered to a metallic flexure. As arms 37a are flexed under load, elements 39 become progressively packed closer together and between the hub and rim portions. Once contact between elements 39 is made, further flexing of arms 37a discontinues thus providing rigidity to the tire. While elements 39 are shown only in the embodiment of FIG. 8, it is evident from a reading of the description that this feature can be provided in other embodiments as well.

To determine the effectiveness of wheels constructed in accordance with the description above, a series of test were conducted to compare the performance of nonresilient tires such as skate wheels with tires of the present invention.

EXAMPLE

To further illustrate the advantages of the present invention, a tire 40 such as that shown in FIGS. 9 and 10 was constructed and employed in a series of tests. FIG. 9 depicts the tire 40 in perspective while companion FIG. 10 shows the side of the same tire 40. This design was selected primarily because of ease of tooling for the fabrication. As can be seen, deflecting members 42 are oriented at a predetermined angle of inclination to the radial lines much the same as shown in FIG. 1. The tire was formed from the urethane (commercially available, for example, from Du Pont) via a conventional die molding process.

A four tire cart was constructed with two pairs of guide wheels mounted to the underside of the cart carriage to guide the cart along an inverted "T" guide path. The standard tires were commercially available skate wheels, as, for example, from Rexnord Inc. Catalogue Mathews HB3, steel wheels #115.

The guide path was approximately 40 feet long and inclined to an angle of about 2°. Various loads were placed upon the chart which was permitted to move freely from rest down the inverted "T" path for a controlled distance. Timing was recorded using an electric stop watch actuated with limit switches set to trigger on the arrival of the front of the cart.

The results can be seen in the graph depicted in FIG. 11. Curve 44 depicts a plot of the average final speed of the carriage on steel wheels as a function of load. It should be noted that the slope of curve 44 is almost horizontal indicating little variation in final speed. Curve 46 represents the final velocity of the carriage on tires constructed in accordance with the invention as a function of load.

The final velocity of the carriage supported on such tires steadily decreased from five pounds to about twenty-two pounds load and remains relatively constant thereafter. It should be noted, however, that the final velocity at all times was considerably below that of the carriage with steel wheels.

FIG. 12 illustrates a graph of speed as a function of the distance traveled with load being held constant. It is important to note that curve 48 clearly showed an increase of speed for steel wheels. In contrast, curve 50 illustrates that the cart having wheels of the present invention had little increase in speed over a thirty foot track.

FIG. 13 illustrates a particular application of the present invention and the variety of possibilities attending appropriate employment of the wheels in different combinations. As shown, wheels of the type described previously are set forth in an array like that found in a gravity conveyor. A first group of wheels 52 having an angle of inclination of $\alpha'$ are supported for free rotation by a parallel support frame 54. A second group of wheels 56 having an angle $\alpha''$ are similarly supported by frames 54 below wheels 54. By providing different resilience and hysteresis values for each group, the speed of an object moving down the surface defined by the rims of the wheels is increased or decreased by appropriate selection of the values. Changing the angle of inclination by physical reversing the wheels provides still a different speed control. For an array having two groups of wheels with different inclination angles, three distinct combinations can be used.

Still another group of wheels 58 are shown in FIG. 13 as having alternate inclination angles, illustrating a means by which the speed of an object can be precisely controlled. Additionally, the alternate rows could be appropriately connected to a means for selectively lowering rows of like angle of inclination out of contact with the object, again providing a means of controlling the speed.

Still another application is shown in the side view schematic of FIG. 14 which illustrates a three tiered gravity conveyor 60 with sections 62, 64, 66 each having wheels defining surfaces inclined at different angles to the horizontal. By utilizing wheels for each tier having appropriately predetermined angles of inclination, a load may be moved over all sections of the conveyor at the same speed irrespective of the angle at which the sections are inclined to the horizontal. Alternatively, it may be desired to move articles at a slower rate on one portion of a gravity conveyor than another even though the first portion may have a steeper incline. Selection of wheels with appropriate angles of inclination provide a very convenient means of accomplishing this result.

May other modifications, combinations and uses of the present invention will be evident after a reading of the disclosure. Such modifications are intended to be within the spirit of the present invention as defined by the appended claims.

I claim:

1. A gravity conveyor comprising
  (a) support means
  (b) a first group of wheels mounted for free rotation on axles secured to said support means,
  (c) a second group of wheels mounted for free rotation on axles secured to said support means,
  (d) said wheels in first and second groups further including:
   (1) a hub contacting portion adapted to be secured to a hub for rotation about an axis;
   (2) a rim portion; and
   (3) a multiplicity of flexure members having a predetermined resiliency value extending from said hub portion to said rim portion, said flexure members defined continuous voids extending from one side of said wheel to the other and deforming under load,
  said wheels of the first group have flexure members having an angle of inclination different from the second group, said wheels in the first and second groups, having total resilience sufficient to provide a first and second terminal speeds, respectively, to an object moving thereover when the surfaces defined by the wheels of the respective groups of wheels have the same angle with respect to the horizontal plane.

2. The gravity conveyor of claim 1 in which the surface defined by the wheels of the first group is at an angle to the surface defined by the wheels of the second group such that the objects moving thereover move at the same speed irrespective of location of the conveyor.

* * * * *